United States Patent
Gupta

(10) Patent No.: US 12,051,073 B2
(45) Date of Patent: Jul. 30, 2024

(54) DISTRIBUTED LEDGER BASED ARTIFICE PROHIBITION TECHNOLOGY

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 151 days.

(21) Appl. No.: 17/389,517

(22) Filed: Jul. 30, 2021

(65) Prior Publication Data
US 2023/0035049 A1    Feb. 2, 2023

(51) Int. Cl.
| | |
|---|---|
| G06Q 20/40 | (2012.01) |
| G06Q 20/20 | (2012.01) |
| G06Q 20/38 | (2012.01) |
| H04L 9/00 | (2022.01) |
| H04L 9/08 | (2006.01) |

(52) U.S. Cl.
CPC ......... *G06Q 20/4016* (2013.01); *G06Q 20/20* (2013.01); *G06Q 20/3823* (2013.01); *G06Q 20/3829* (2013.01); *G06Q 20/389* (2013.01); *G06Q 20/407* (2013.01); *H04L 9/0825* (2013.01); *G06Q 2220/00* (2013.01); *H04L 9/50* (2022.05); *H04L 2209/56* (2013.01)

(58) Field of Classification Search
CPC ............... G06Q 20/4016; G06Q 20/20; G06Q 20/3823; G06Q 20/3829; G06Q 20/389; G06Q 20/407; G06Q 2220/00; G06Q 20/02; G06Q 20/401; H04L 9/0825; H04L 9/50; H04L 2209/56
See application file for complete search history.

(56) References Cited

U.S. PATENT DOCUMENTS

| | | | |
|---|---|---|---|
| 2015/0235206 A1* | 8/2015 | Murphy, Jr. | G06Q 20/4016 705/44 |
| 2017/0243208 A1* | 8/2017 | Kurian | G06Q 20/322 |
| 2018/0108007 A1* | 4/2018 | Sawant | G06Q 20/20 |

(Continued)

OTHER PUBLICATIONS

Galal et al., Nano-networks communication architecture: Modeling and functions, 2018 (Year: 2018).*

(Continued)

*Primary Examiner* — Courtney P Jones
*Assistant Examiner* — Christine Dang
(74) *Attorney, Agent, or Firm* — Weiss & Arons LLP

(57) ABSTRACT

Apparatus and methods are provided for multiple debit/credit cards from a family/friend group to enter in a distributed ledger network such as a blockchain. These networked cards may store, and replicate records of all transactions initiated by each card using immutable cryptographic signature. A secure mobile app may link and delink cards to the network. Linked cards may maintain transaction amount, time, place, date, location, key type pattern, user's image, voice sample, user info for all the other cards in the distributed ledger. Whenever any card performs a transaction, a record of the transaction is replicated locally on the same card and copied to all other cards in the distributed ledger network. Any care may verify all the attributes of past transactions, compare those attributes to current transaction attributes and alert other cards in the network in response to detecting suspicious transaction activity.

13 Claims, 4 Drawing Sheets

(56) References Cited

U.S. PATENT DOCUMENTS

| | | | | |
|---|---|---|---|---|
| 2019/0147708 A1* | 5/2019 | Monaco | ............... | G06Q 20/065 |
| | | | | 705/16 |
| 2019/0318359 A1 | 10/2019 | Arora | | |
| 2020/0184467 A1* | 6/2020 | Segaran | ............. | G06Q 20/3829 |
| 2021/0012582 A1* | 1/2021 | Hausman | ............... | H04L 9/3247 |
| 2021/0050990 A1* | 2/2021 | Hearn | ................. | H04L 9/0637 |
| 2021/0312431 A1* | 10/2021 | Ravinathan | ........ | G06Q 20/3829 |
| 2021/0326887 A1* | 10/2021 | Zhan | ................... | H04L 63/0823 |
| 2022/0327518 A1* | 10/2022 | Martin Perez | ........... | G07C 9/27 |

OTHER PUBLICATIONS

Muratov et al., YAC: BFT consensus algorithm for blockchain, 2018 (Year: 2018).*

\* cited by examiner

DISTRIBUTED LEDGER BASED ARTIFICE PROHIBITION TECHNOLOGY

FIELD OF TECHNOLOGY

This application describes apparatus and methods for overcoming technical challenges of utilizing generally low power Internet of Things ("IoT") devices in conjunction with reliable distributed ledger technology (e.g., blockchain) verification processes.

BACKGROUND

Distributed ledger technology may refer to a decentralized, tamperproof and transactional database. A distributed ledger provides a distributed, immutable, transparent, secure and auditable ledger of transactions. The distributed ledger may provide a secure way to store and process transactions among untrusted nodes on a network. The distributed ledger may include a protocol that allows transactions to be verified by unreliable nodes. The distributed ledger can be consulted openly and fully, allowing access to all transactions that have occurred since the first transaction of the system, and can be verified and collated by any entity at any time. The distributed ledger also stores transactional information in a fashion that prevents alteration of the records stored in the distributed ledger.

The distributed ledger may store information in linked segments, or a chain of "blocks." The linked blocks may collectively form a "blockchain." Each block may store a set of transactions performed at a given time. Blocks are linked or chained to each other by a reference to the previous block. Each block in the distributed ledger is linked to the previously approved block using a cryptographic hash code of the previous block.

Security is accomplished by imposing strict rules and mutual agreement among nodes when attempting to add a new block of transactions to the distributed ledger. The strict rules and mutual agreement protocols may be referred to as a consensus mechanism. The consensus mechanism synchronizes the decentralized ledger across all nodes that write to the distributed ledger. The consensus mechanism ensures that all nodes agree on a single authoritative copy of the distributed ledger. Nodes that write to the distributed ledger network may be programmed to recognize the longest chain in a network of nodes as the authoritative source of information for the distributed ledger.

A key component of the consensus mechanism is proof of work. Each node must successfully solve a computationally intensive task before adding a new block to the distributed ledger. The proof of work must be complex to solve and at the same time easily verifiable once completed. This dichotomy ensures that only one node is authorized to add a new block and that all other nodes can easily verify that the new block has been properly linked to a prior block. The computationally intensive nature of the block generation process provides tamperproof and auditable transactional database.

It is computationally expensive for a malicious attacker to modify a block and attempt to corrupt its contents. The rest of the trusted nodes on the network would continuously generate new blocks, outrunning the attacker in the block generation process. Therefore, a trusted branch of blocks will grow faster than any blocks that can be generated by the attacker. Nodes on a network are programmed to recognize the longest chain in the network as the authoritative source of information. The nodes on the network will therefore invalidate any shorter chains generated by the attacker.

In order for a manipulated block to be successfully added to the distributed ledger, it would be necessary for the malicious attacker to solve the proof of work faster than the rest of nodes on the network. This is structured to be computationally too expensive for the attacker. Accomplishing this feat requires having control of at least 51% of the computing resources in the network.

Despite the described advantages of distributed ledger technology, there are technical hurdles to adopting this technology in connection with financial transactions. Financial transactions are typically initiated by a payment instrument that has limited computing resources. For example, payment instruments may be 85.60 millimeters ("mm")× 53.98 mm×0.8 mm. This limited form factor allows payment instruments to fit easily into a user's wallet or pocket yet limits computational resources that can be built into to such devices. More powerful mobile devices, such a smartphone may also function as a payment instrument. However, even these relatively more powerful mobile devices have limited computational power and battery life.

A distributed ledger's high computing costs and large storage requirements pose a challenge to widespread adoption of the technology in connection with networks of payment instruments that have limited power and storage capacities. For example, the energy consumption associated with one network implementing distributed ledger technology is estimated to be comparable to the domestic power consumption of an entire country. The high computational power required to run consensus mechanisms has impeded advancement of distributed ledger technology-based applications on resource constrained payment instruments.

It would be desirable to provide distributed ledger technology that may be deployed to enhance reliability and security of financial transactions. It would be desirable to provide technology for adopting distributed ledger technology for use in connection with payment instruments having limited computational power. Accordingly, it is desirable to provide DISTRIBUTED LEDGER BASED ARTIFICE PROHIBITION TECHNOLOGY.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
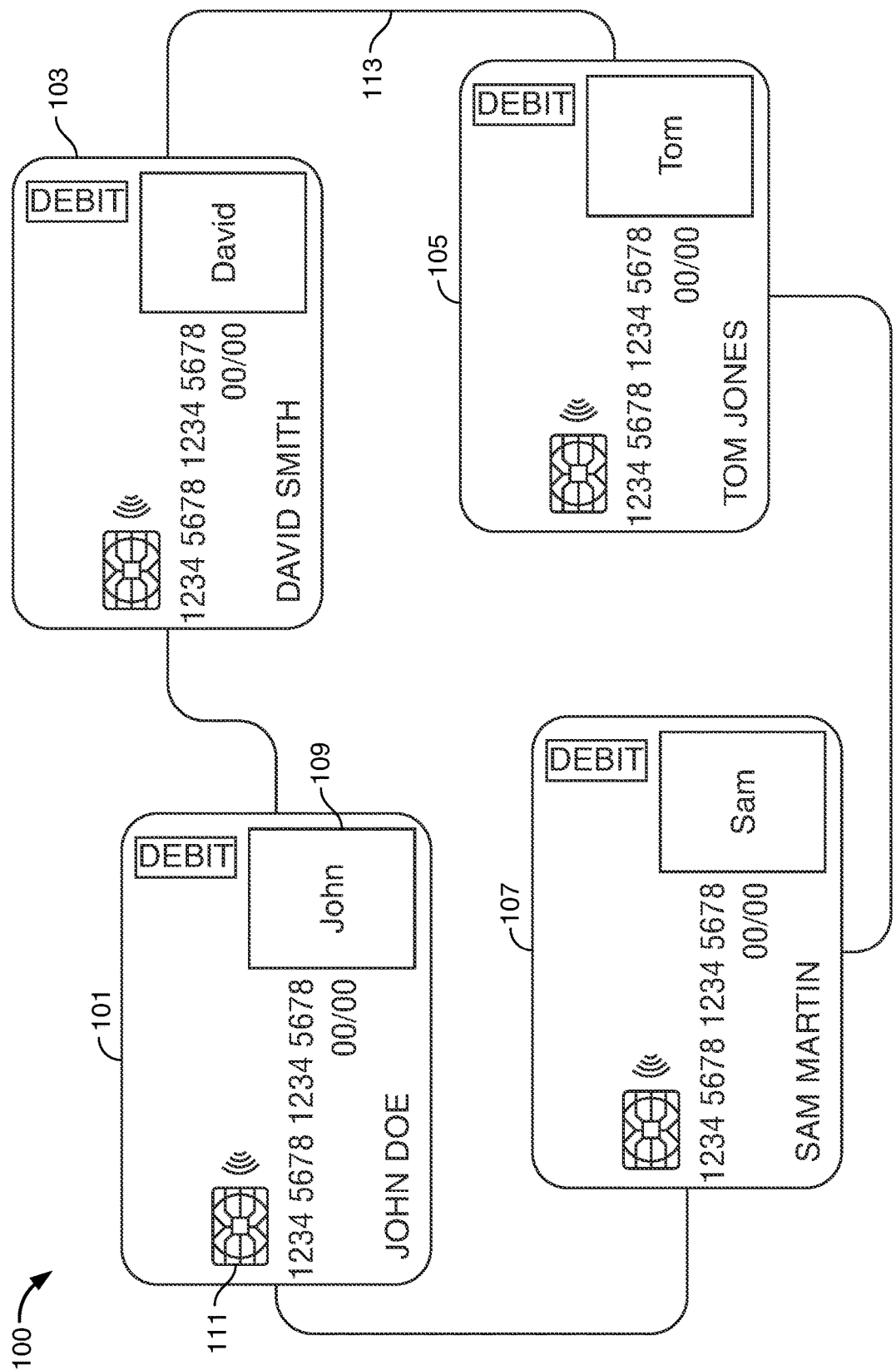
FIG. 1 shows an illustrative network in accordance with the principles of the disclosure.

Real time theft prevention of a payment instrument or online misuse of payment instrument information remains a real threat. There were 650,572 cases of identity theft in the U.S. in 2019. Of those, 41 percent, or just over 270,000, were associated with payment instrument fraud. Currently distributed ledger technology is not available to detect and block a transaction initiated using a stolen payment instrument or an online transaction initiated using stolen identity.

Apparatus and methods described herein allow multiple payment instruments within minimal computing resources to form and enter into a distributed ledger network. Each of these payment instruments may be a node on the distributed ledger network. Each payment instrument or node may store an immutable record of all transactions initiated by each of the other nodes on the distributed ledger network. The record may be stored locally on each node using an immutable cryptographic signature. Adding and removing of nodes to/from the distributed ledger network may be accomplished using an online banking portal.

Locally stored transaction records maintained by each node may include transaction attributes associated with each recorded transaction. Illustrative attributes may include transaction amount, transaction time, transaction location, transaction date, key type pattern captured at the transaction time, an image captured at the transaction time and/or a voice sample captured at the transaction time. Table 1 shows illustrative transaction attributes and associated values.

TABLE 1

Illustrative transaction attributes and associated values.

| Illustrative Transaction Attributes | Illustrative Associated Value |
|---|---|
| Geographic | Longitude/latitude |
| | GPS coordinates |
| | Map coordinates |
| | Elevation |
| | Depth |
| | Distance from a point |
| | Address |
| | Zip code |
| | Area code |
| | County |
| | State |
| | Country |
| | IP address |
| | Signal triangulation |
| Temporal | Seconds |
| | Minutes |
| | Hours |
| | Day |
| | Week |
| | Month |
| | Year |
| | Duration |
| Synoptic | Weather at time of transaction |
| | Stock market performance at time of transaction |
| | Transaction participant credit risk |
| Transaction amount | Dollars |
| | Available credit |
| | Currency |
| | Foreign exchange rate |
| | Low value purchase |
| Number of items purchased | Number |
| | Number of distinct stock keeping units ("SKU") |
| Merchant category code | Numerical identifier |
| | Taxation status |
| | Associated acquirer |
| Payment instrument identifier | Brand |
| | Rewards |
| | Transaction Network |
| | Issuer |
| | Affinity |

TABLE 1-continued

Illustrative transaction attributes and associated values.

| Illustrative Transaction Attributes | Illustrative Associated Value |
|---|---|
| Loyalty program | Rewards/point balance |
| | Membership level |
| | Duration of membership |
| | Frequency of use |
| Access channel | Point-of-sale |
| | Automated teller machine |
| | Online portal |
| | Self-service kiosk |
| | Mobile device |
| | In person |
| Card holder | Key press patterns |
| | Voice sample |
| | Image sample |
| | Average transaction amount |
| | Biometric authentication |

Nodes on the distributed ledger network may include an embedded network interface card ("NIC"). The NIC may implement protocols for wireless communication. The NIC may provide Wi-Fi, Near Filed Communication ("NFC"), Bluetooth or any other suitable mode of wireless communication. Wi-Fi may include passive Wi-Fi having lower power consumption than typical Wi-Fi. The NIC may have a thickness that is not greater than 0.8 mm. Such a NIC may be referred to herein as a nano-NIC ("nNIC").

Each node may include a processor circuit. The processor circuit may have a thickness that is not greater than 0.25 mm. The processor circuit may control overall operation of the node and its associated components. Each node may include RAM, ROM, an input/output ("I/O") module and a non-transitory or non-volatile memory.

The I/O module may include a microphone, button(s) and/or touch screen which may accept user provided input. The I/O module may include one or more of a speaker for providing audio output and a video display for providing textual, audiovisual and/or graphical output. The video display may include one or more organic light emitted diodes ("OLEDs").

OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display (hereinafter, "LCD") power must be supplied to the entire backlight even to illuminate just one pixel in the display. In contrast, an OLED display does not necessarily include a backlight. Furthermore, in an OLED display, preferably, only the illuminated pixel draws power. Therefore, power efficiency of OLED technology presents a possibility for designing payment instruments that provide enhanced security and functionality.

The payment instrument may utilize computer-executable instructions, such as program modules, being executed by a computer. Generally, program modules include routines, programs, objects, components, data structures, etc. that perform particular tasks or implement particular abstract data types. The payment instrument may be operational with distributed computing environments where tasks are performed by remote processing devices that are linked through a communications network. In a distributed computing environment, program modules may be located in both local and remote computer storage media including memory storage devices.

Software and associated program modules may be stored within the non-transitory memory and/or other storage medium of a payment instrument. The software may provide instructions to the processor for performing various functions. For example, the non-transitory memory may store software used by the payment instrument, such as an instance of a distributed ledger client, operating system, application programs, and an associated database. Alternatively, some or all of computer executable instructions of the payment instrument may be embodied in hardware or firmware components of the payment instrument.

Other exemplary application programs used by the payment instrument may include computer executable instructions for invoking user functionality related to communication, such as email, short message service ("SMS"), and voice input and speech recognition applications. Application programs may generate alerts, process received executable instructions, perform power management routines or other suitable tasks.

To operate in connection with a distributed ledger network, a payment instrument may operate in a networked environment. The payment instrument may support establishing network connections to one or more remote computers. Such remote computers may be other nodes on the distributed ledger network. The nodes may be personal computers or servers that include many or all of the elements described above in connection with an illustrative payment instrument. Network connections may include a local area network ("LAN") and a wide area network ("WAN") and may also be compatible with other networks protocols and architectures. When used in a networking environment, the payment instrument may be connected to a network through the nNIC.

The existence of any of various well-known protocols such as TCP/IP, Ethernet, FTP, HTTP and the like is presumed, and the payment instrument can be operated in a client-server configuration to permit a user to retrieve web pages from a web-based server. It will be appreciated that the network connections described are illustrative and other means of establishing a communications link between devices may be used. Web browsers can be used to display and manipulate data on web pages.

The payment instrument may include various other components, such as a battery, speaker, and antennas (not shown). For example, network nodes may be portable devices such as a laptop, tablet, smartphone or any other suitable device for receiving, storing, transmitting and/or displaying relevant information. The payment instrument may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The payment instrument may include a battery. The battery may be a power source for electronic components of the payment instrument. For example, the battery may supply power to the OLED display, the communication circuit and the processor circuit. The battery may have a thickness that is not greater than 0.5 mm. In some embodiments, the payment instrument may include a plurality of batteries.

Apparatus and methods may include creating a distributed ledger network linking multiple payment instruments. Exemplary nodes on in the distributed ledger network may include debit/credit cards. All nodes on the distributed ledger network may store a local copy of all transactions performed by each node. Each transaction stored locally may be linked to an adjacent transaction by an immutable cryptographic signature.

All nodes on the network may include hardware for establishing network connection and data exchange. Whenever any node initiates a transaction, an immutable record of that transaction is replicated to the initiating node and all other nodes on the distributed ledger network. Because prior transaction records are stored locally by each node, each node has the capability to verify attributes of past transactions, compare past attributes to current transaction attributes and detect potentially anomalous transaction activity.

Each node may have the ability to independently detect potentially anomalous transaction activity and alert other nodes in distributed ledger network in response to detecting such activity. As part of a consensus mechanism, other nodes on a network may block potentially fraudulent transactions before they are recorded on in a blockchain or any other distributed ledger. A consensus mechanism provides a method for nodes to come to an agreement on what to or what not to accept as a valid transaction on the distributed ledger. Illustrative consensus mechanisms may include Proof-of-work, Proof-of-stake, Proof-of-activity, Practical Byzantine Fault Tolerance and Delegated Byzantine Fault Tolerance.

In response to detecting a target transaction initiated by a first node, all other nodes may analyze transaction attributes associated with the target transaction. Illustrative attributes may include key press pattern, voice sample or image sample. Attributes of a current transaction may be compared to historical attributes associated with prior transactions that a distributed ledger stored locally on each node. Each node in the distributed ledger network may have the capability to independently reject a potentially anomalous transaction. The rejection of the transaction itself may be recorded in the distributed ledger.

The distributed ledger network may require that each transaction initiated by a node must be approved/rejected by all nodes in the network before the transaction is approved for execution and recordal in the distributed ledger. Distributed ledger transaction data may be stored in a central, remote location. The distributed ledger network may require all nodes in the network come to a unanimous consensus whether to approve or reject a transaction. In some embodiments, consensus rules that do not require uniform consensus may be pre-programmed into the distributed ledger network.

In a hypothetical use case, if a payment instrument is stolen and used to initiate a fraudulent transaction, all other nodes in the distributed ledger network decide whether to approve/reject the transaction initiated by the stolen payment instrument. The other nodes may determine whether to approve/reject the transaction based on prior transaction histories stored locally on the other nodes. This architecture may also be utilized to enforce use-based restrictions on a payment instrument. For example, this architecture may be utilized to enforce parental or vendor restrictions on child/employee payment instruments.

A fraud resistant transaction network is provided. The fraud resistant transaction network may include a plurality of nodes that are configured to read and write to a distributed ledger. The network may include a first payment instrument ("PI"). The first PI may include a first nano network interface card ("nNIC"). The first PI may include a first processor. The first PI may include a first memory location. The first memory location may store a first cryptographical key and a first instance of a distributed ledger node application.

The network may include a second PI. The second PI may include a second nNIC. The second PI may include a second processor. The second PI may include a second memory location. The second memory location may store a second instance of a distributed ledger node application.

The network may include a merchant point-of-sale terminal ("MPOS"). The MPOS may store a third instance of the distributed ledger node application. The first PI may initiate a transaction at the MPOS. The first PI may initiate the transaction by activating the first instance of the distributed ledger node and signing the transaction using the first cryptographic key. The first PI may then use the first nNIC to broadcast the transaction to one or more nodes on the fraud resistant transaction network.

The MPOS, in response to receiving the transaction may activate the third instance of the distributed ledger node application. The third instance of the distributed ledger node application verifies that the transaction has been signed by the first cryptographic key. The third instance of the distributed ledger node application may implement a consensus mechanism that stores the transaction locally on the MPOS when the transaction is signed using the first cryptographic key and is bounded by at least two prior transactions received from the first PI.

The second PI may also receive the transaction broadcast by the first PI. In response to receiving the broadcast transaction, the second PI activates the second instance of the distributed ledger node application. The second instance of the distributed ledger node application verifies that the broadcast transaction has been signed by the first cryptographic key. The second instance of the distributed ledger node application determines whether the broadcast transaction is bounded by at least two prior transactions received from the first PI and stored locally in the second memory location.

Determination of whether the broadcast transaction is bounded by at least two prior transactions may involve the second instance of the distributed ledger node application examining historical transactions saved to the distributed ledger and stored locally on the second PI. The second instance of the distributed ledger node application may search specifically for transactions that originated from the first PI.

The second instance of the distributed ledger node application may examine transaction attributes associated with the transaction that originated from the first PI. The second instance of the distributed ledger node application may determine whether transaction attributes of a newly received transaction fit within a pattern or range of values associated with the attributes of the historical transactions. Machine learning algorithms may be utilized to detect patterns and value ranges.

After confirming that the transaction is bounded by at least two prior transactions received from the first PI, the second PI may authorize the MPOS to execute the transaction. After authorizing the MPOS to execute the transaction, the second PI may store the broadcast (and now approved) transaction in the second memory location. After receiving approval to execute the transaction from the second PI, the MPOS executes the transaction.

The second PI may instruct the MPOS to abort a transaction initiated by the first PI. The second PI may abort a transaction when the transaction is not bounded by at least two prior transactions stored locally in the second memory location. The second PI may abort the transaction when the transaction is not signed using the first cryptographic key.

The fraud resistant transaction network may include a third PI. The MPOS, in response to receiving the transaction broadcast by the first PI may determine that the second PI and the third PI are accessible on the fraud resistant transaction network via the first and third nNICs. The MPOS may await authorization from both the second PI and the third PI before executing the transaction broadcast by the first PI.

The MPOS may abort the broadcast transaction when one or more of the second PI or third PI instructs the MPOS to abort the transaction. One or more of the second or third PI may determine that the transaction broadcast by the first PI includes one or more transaction attributes that are atypical for transactions initiated by the first PI and stored in the distributed ledger. One or more of the second or third PI may determine that the transaction broadcast by the first PI includes one or more transaction attributes that are atypical for transactions initiated by the first, second or third PI and stored in the distributed ledger.

The third PI may include a third nNIC. The third PI may include a third processor. The third PI may include a third memory location storing a fourth instance of a distributed ledger node application. The third PI, in response to receiving the transaction broadcast by the first PI may activate the fourth instance of the distributed ledger node application. The third PI may verify that the transaction has been signed by the first cryptographic key. The third PI may also determine whether the transaction broadcast by the first PI is bounded by at least two prior transactions received from the first PI and stored locally in the third memory location.

After verifying the cryptographic signature and confirming that the broadcast transaction is bounded by other transactions received from the first PI, the third PI may authorize the MPOS to execute the transaction. After authorizing the MPOS, the third PI may store a copy of the transaction locally in the third memory location. Storing the copy locally may include appending the transaction to a local copy of the distributed ledger resident on the third PI. The approval of the third PI may be sufficient consensus to append the broadcast transaction to the local copy of the distributed ledger.

The second memory location of the second PI may store a second cryptographical key. The second PI may authorize the MPOS to execute the transaction broadcast by the first PI by countersigning the broadcast transaction using the second cryptographical key and transmitting the countersigned transaction to the MPOS. The second PI may authorize the MPOS to execute the transaction by transmitting to the MPOS the transaction broadcast by the first PI cryptographically hashed to at least one other transaction stored locally in the second memory location.

The first instance of the distributed ledger node application running on the first PI may capture one or more transaction attributes of the transaction broadcast by the first PI. The first instance of the distributed ledger node application may broadcast the transaction attributes along with the transaction to other nodes on the network.

The broadcast transaction and its associated attributes may form a transaction record. The second PI may determine that the received transaction record is bounded by at least two prior transactions received from the first PI. The second PI may verify that the transaction record includes attributes that are within a predetermined range of stored transaction attributes associated with the least two prior transactions received from the first PI and stored locally in the second memory location.

Illustrative transaction attributes may include one or more of: transaction amount, transaction time, transaction place, transaction date, transaction location, first PI user image, first PI voice sample and first PI user key press pattern.

The second instance of the distributed ledger node application executed on the second PI may dynamically control allocation of storage space within the second memory location by limiting a number of "blocks" stored locally in the second memory location. The dynamic allocation of storage space may limit a size of the distributed ledger stored on the second PI. Limiting the size of the locally stored copy of the distributed ledger may allow the second PI to compare a received transaction to stored transactions despite conventional constraints on computing power available to the second PI.

Locally, the second and third PIs may store different sets of transactions broadcast by the first PI. However, values for transaction attributes across transactions initiated by the first PI may all be within pre-determined bounds. If any PI, after consulting its locally stored copy of the distributed ledger determines that a broadcast transaction seems anomalous, the PI may reject or abort that broadcast transaction.

The MPOS may submit an authorization request for the transaction broadcast by the first PI to an issuer authorization system. The MPOS may submit an authorization request to the issuer authorization system in parallel with waiting for an authorization response from the second PI, third PI or any PI on the distributed ledger network. In some embodiments, the MPOS may receive a response from the distributed ledger network before receiving a response from the issuer authorization system. In such embodiments, the response received from the issuer authorization system may override the authorization response received from the distributed ledger network. In some embodiments, the MPOS may receive a response from the distributed ledger network after receiving a response from the issuer authorization system.

Methods for real-time fraud detection are provided. Methods may include initiating a transaction at a point-of-sale ("POS") terminal. The transaction may be associated with one or more transaction attributes. The transaction may be initiated using a first node on a fraud resistant transaction network. The fraud resistant transaction network may include a plurality of nodes that are configured to read and write to a distributed ledger. The first node may be a first payment instrument ("PI").

Methods may include, using a cryptographic key stored in a secure location on the first PI, signing the transaction and signing at least one transaction attribute associated with the transaction. Methods may include broadcasting a copy of the transaction and the at least one transaction attribute to nodes on the fraud resistant transaction network.

Methods may include, at a second node on the fraud resistant transaction network, capturing the broadcast transaction and transaction attribute. At the second node, methods may include verifying the transaction and the at least one transaction attribute. Verification may include confirming authenticity of the digital cryptographic signature applied to the transaction and associated attribute.

Verification may include confirming that at least one transaction attribute has a value that is within a range of values associated with other transactions initiated by the first node. The range of values may be defined by historical records of transactions initiated by the first node and stored locally on the second node. The range of values may be defined by historical records of transactions initiated by one or more other nodes and stored locally on the second node.

Methods may include, in response to a successful authenticating, cryptographically appending the authenticated transaction and associated transaction attribute(s) to the locally stored historical transaction record. Methods may include broadcasting a copy of the locally stored historical transaction record to other nodes on the fraud resistant transaction network. Methods may include, at the POS terminal and in response to receiving the historical transaction record, authenticating the appending to the new transaction to the historical transaction record.

Authenticating the appending may include verifying that Each block of transactions contains a target hash value of the previous block in its header (starting from an initial block called the "genesis" block). An exemplary target hash value may be a hash value generated by the SHA-256 hash function include have a required number of leading zeros. This such a requirement mandates that the hash value in each block header depends on the hash value of the prior block in the chain. Accordingly, any change in the data of one block would affect all other blocks that follow, effectively preventing manipulation of the records by a malicious node.

After authenticating the broadcast transaction, methods may include executing the transaction at the POS terminal. The POS terminal may execute the broadcast based on successful verification of the appending without receiving authorization from an issuer system. In response to a failure to authenticate the transaction attribute value or a failure to verify the appending, the second node may broadcast instructions to the fraud resistant transaction network instructing all nodes on the network to reject the transaction initiated and broadcast by the first node.

The second node may be one of a plurality of nodes that receive the transaction and transaction attribute broadcast by the first node. Methods may include, at the POS terminal, receiving a copy of a historical transaction record stored locally on each node. Segments of the historical transaction record may be linked to each other using a blockchain or other distributed ledger technology.

Methods may include authorizing execution of a broadcast transaction when the copies of historical transaction records associated with the broadcasting node stored locally on other nodes are all identical. Identical copies of historical transaction records stored on multiple nodes may confirm that the broadcasting nodes has been initiating transactions that have been consistently approved by other nodes.

Methods may include authorizing execution of a broadcast transaction when copies of locally stored historical transaction records received from other nodes are associated with values within a threshold range of the values of the broadcast transaction attribute(s). Methods may include rejecting or aborting a broadcast transaction when at least one transaction attribute value among the local copies of the historical transaction records is outside the threshold range.

Each of the plurality of nodes on a fraud resistant transaction network may have dimensions of 85.60 millimeters ("mm")×53.98 mm×0.8 mm. Each of the plurality of nodes may have insufficient computing power to recompute the hash values of each block in a locally stored transaction record. Therefore, each node may not be capable of altering the historical transaction record stored locally on any node.

Each of the plurality of nodes may include an organic light emitting diode ("OLED") display. Methods may include presenting, on the OLED display, a transaction and values of associated transaction attributes that have been broadcast to the network by the first node.

A fraud resistant transaction network is provided. The fraud resistant transaction network may include a plurality of nodes that are configured to read and write to a distributed ledger. The network may include a first payment instrument ("PI"). The first PI may include a first nano network interface card ("nNIC"). The first PI may include a first processor. The first PI may include a first memory location. The first memory location may store a first cryptographical key and a first instance of a distributed ledger node application.

The network may include a second PI. The second PI may include a second nNIC. The second PI may include a second processor. The second PI may include a second memory location. The second memory location may store a second instance of a distributed ledger node application. A distributed ledger node application may provide software that implements rules for interacting with other nodes on a blockchain or any other distributed ledger technology ("DLT").

For example, a distributed ledger node application may control implementation of cryptographic and consensus mechanisms for how new blocks (e.g., groups of transactions) are added to a blockchain or other immutable record of historical transactions. The distributed ledger node application may control application of private/public-key cryptography and generation/verification of cryptographic hash values.

The first PI may initiate a transaction by activating the first instance of the distributed ledger node application. The first distributed ledger node application may sign the transaction using the first cryptographic key. The first PI may use the first nNIC to broadcast the transaction to other nodes on the fraud resistant transaction network.

The second PI, in response to receiving the transaction broadcast by the first PI may activate the second instance of the distributed ledger node application. The second instance of the distributed ledger node application may verify that the broadcast transaction has been signed by the first cryptographic key. The second instance of the distributed ledger node application may determine whether values of transaction attributes associated with the broadcast transaction are within/outside a predetermined range of values. The predetermined range may be dynamically determined and adjusted by the second instance of the distributed ledger node application. For example, the second instance of the distributed ledger node application may examine two most recent prior transactions received from the first PI and stored locally in the second memory location.

The second instance of the distributed ledger node application may formulate a rejection of the broadcast transaction. The second PI may broadcast a rejection to nodes on the fraud resistant transaction network. Other nodes, in response to receiving a broadcast rejection may thereafter prompt the first PI for a PIN before approving any future transaction initiated by the first PI.

The second memory location on the second PI may store an immutable record of transactions initiated by the first PI and approved by the second PI. Each of the transactions in the immutable record may be sequentially linked to each other by including a target hash value of a previous transaction or block of transactions stored in the second memory location. The first PI, the second PI and other nodes on the network may each have dimensions of 85.60 millimeters ("mm")×53.98 mm×0.8 mm. The first PI and the second PI may each have insufficient computing power to alter the historical transaction record stored locally on each node.

The second PI may include an organic light emitting diode ("OLED") display. The processor on the second PI may present, on the OLED display values of transaction attributes for a transaction broadcast by the first node. The processor on the second PI may present, on the OLED display an acceptance or rejection indicator for a transaction broadcast by the first PI.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 shows illustrative system 100. System 100 includes payment instruments 101, 103, 105 and 107. Each of the payment instruments shown in FIG. 1 includes nNIC 111 and OLED display 109. The payment instruments may be joined to each other to form fraud resistant transaction network 113. Each payment instrument may be a node on fraud resistant transaction network 113. Fraud resistant transaction network 113 may operate a distributed ledger protocol or any other suitable protocol for implementing distributed ledger technology.

Each of the payment instruments shown in FIG. 1 may store and replicate an immutable record of two or more transactions initiated by each of the other payment instruments. The locally stored transaction records may be linked to each other with cryptographic signatures such that the records are immutable by the hosting payment instrument. The transaction record stored locally on each payment instrument may include transaction attributes and associated attribute values for each transaction. Illustrative transaction attributes may include amount, time, place, date, location, key type pattern, user's image and/or voice sample.

Figure 2:
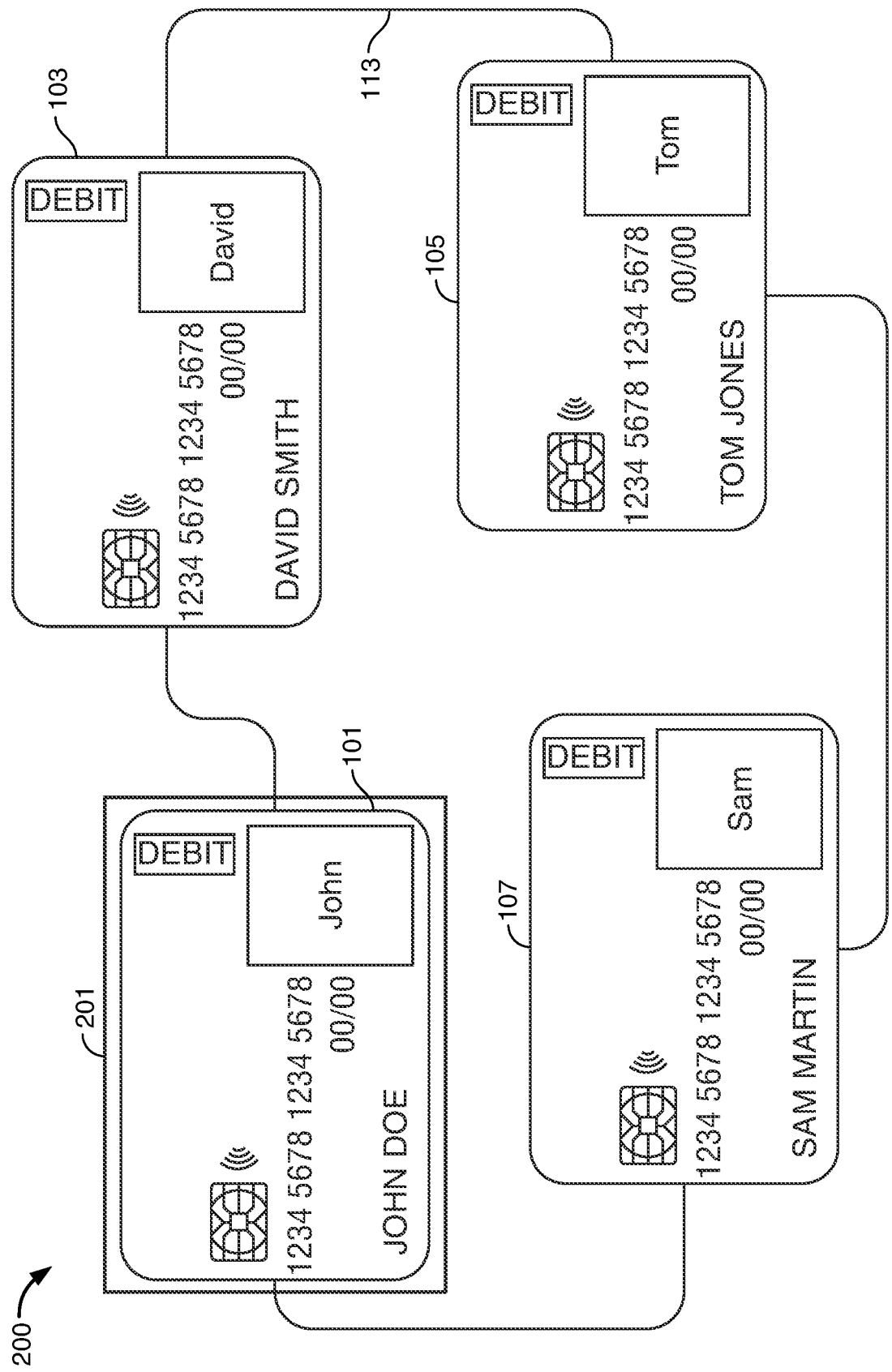
FIG. 2 shows an illustrative state of the network shown in FIG. 1.

FIG. 2 shows illustrative scenario 200. In scenario 200, surrounding border 201 signifies that payment instrument 101 may be compromised. For example, payment instrument 101 may have been stolen from an authorized user. Information associated with payment instrument 101 may have been stolen from an authorized user. The other payment instruments (e.g., 103, 107 and 105) part of fraud resistant transaction network 113 may not be aware that payment instrument 101 has been compromised.

Compromised payment instrument 101 may be used to initiate an unauthorized purchase or other transaction. The transaction initiated by card 101 may be broadcast to all the other payment instruments (e.g., 103, 107 and 105) that are connected to fraud resistant transaction network 113.

Upon receipt of the transaction broadcast by payment instrument 101, each of the other payment instruments may determine whether to authorize the received transaction.

Figure 3:
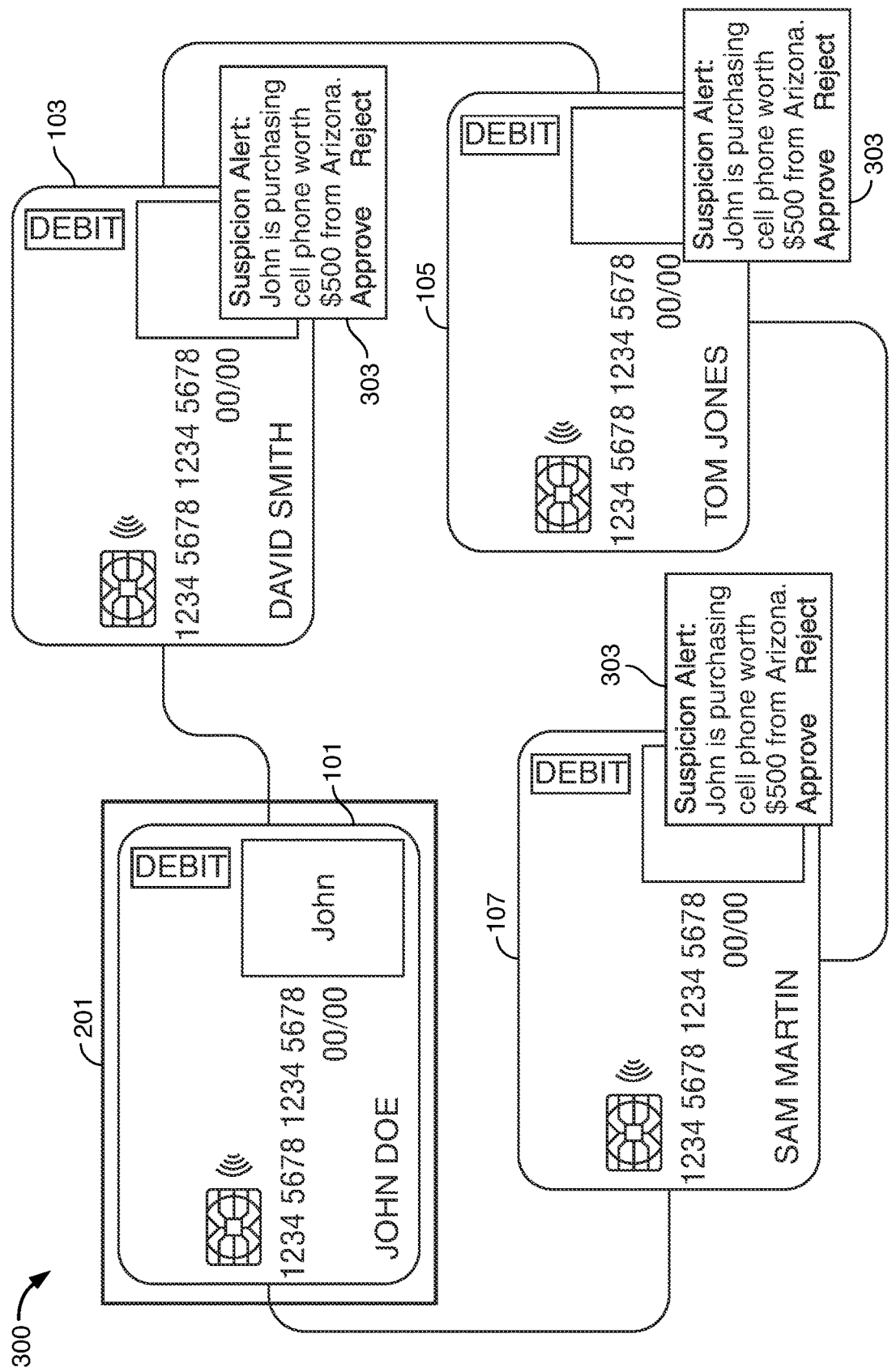
FIG. 3 an illustrative state of the network shown in FIG. 1.

FIG. 3 shows that each of the payment instruments has received a transaction 303 broadcast by payment instrument 101. Broadcast transaction 303 includes attributes indicating that payment instrument 101 is being used to purchase a cell phone worth $500 from a location in Arizona. Each of the payment instruments that receives broadcast transaction 303 may examine locally stored transactions previously received from payment instrument 101. The other payment instruments may examine those locally stored transactions and determine whether the current cell phone purchase received from payment instrument 101 fits with a purchasing pattern exhibited by payment instrument 101.

For example, the other payment instruments may examine whether the current cell phone purchase is associated with past key press patterns, amount patterns, locations of past transactions, images and voice samples (wherever available) associated with past transactions. If one or more of the other payment instruments in fraud resistant transaction network 113 detects anomalous values for one or more transaction attributes of broadcast transaction 303, the cell phone purchase may be rejected.

In some embodiments, when a payment instrument rejects a transaction, an alert may be displayed on OLED screen 109. The alert may provide transaction attribute details. The alert may indicate whether a broadcast transaction has been approved or rejected.

In some embodiments, OLED screen 109 may be touch-sensitive. In some embodiments, a user of a payment instrument may be prompted to touch the displayed "Approve" or "Reject" to decision broadcast transaction 303. A user may be prompted in addition to machine-based processing of broadcast transaction 303. In some embodiments, machine-based processing of broadcast transaction 303 may take account of a response provided by a payment instrument user when decisioning whether to approve or reject a broadcast transaction.

In the scenario shown in FIG. 3, one or more of payment instruments may reject broadcast transaction 303 because a majority of historical transactions stored locally are each associated with transactions in Virginia. Arizona may be outside a threshold distance.

Figure 4:
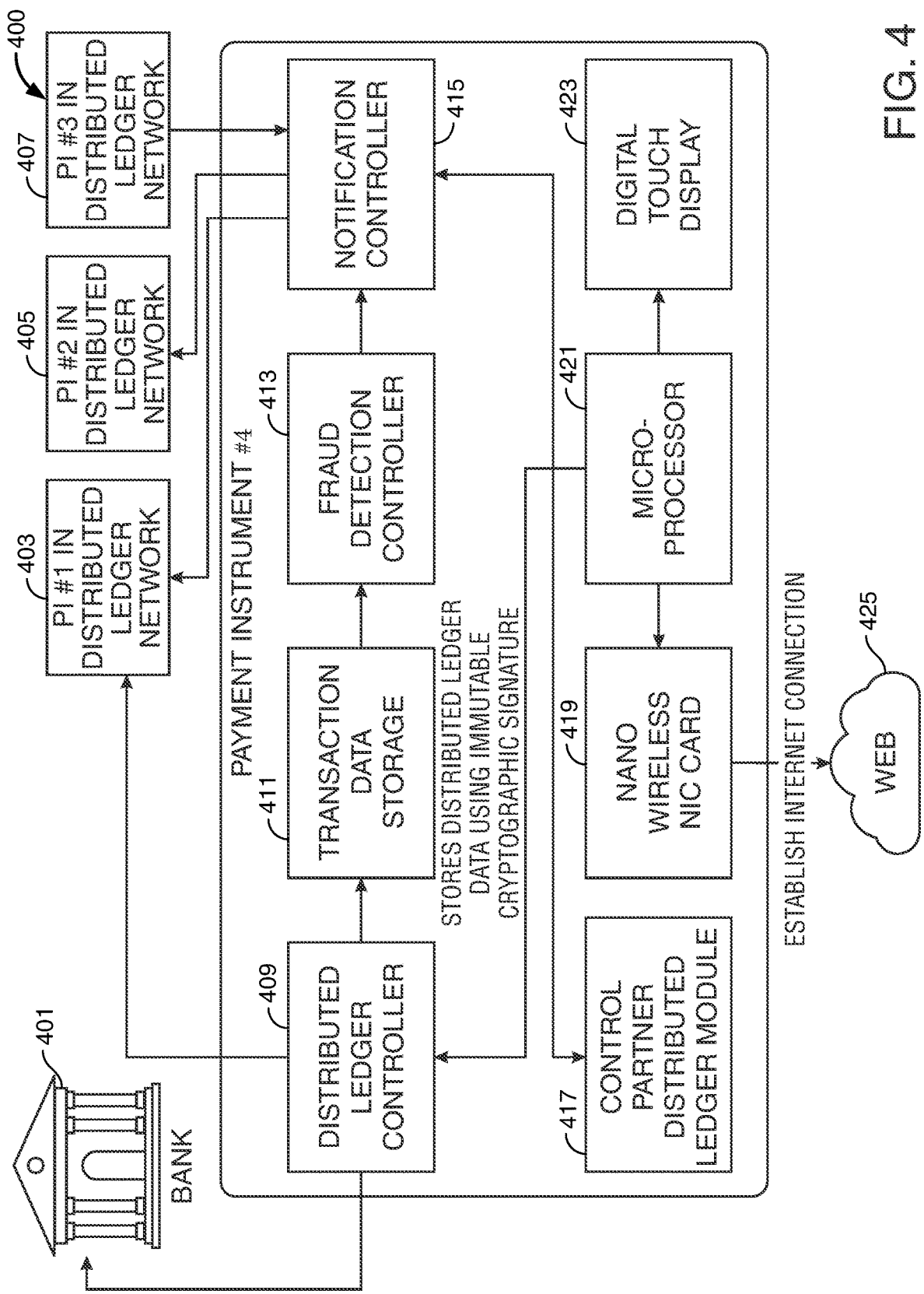
FIG. 4 shows an illustrative system in accordance with the principles of the disclosure.

FIG. 4 shows illustrative system components of a payment instrument or other node on a fraud resistant network and associated process flow 400. Process flow 400 may begin with activation of distributed ledger controller 409. Distributed ledger controller 409 may include an instance of a distributed ledger node application. Distributed ledger controller 409 may be activated in response to receiving a broadcast transaction via nNIC 419. Distributed ledger controller 409 may receive the broadcast transaction via internet access to web 425.

Distributed ledger controller 409 may access transaction and data storage ("TDS") 411. TDS 411 may include transaction records that are recorded in immutable format. TDS 411 may store historical transactions. Fraud detection controller ("FDC") 413 may determine whether the broadcast transaction fits a pattern of values associated with the historical transaction stored in TDS 411.

If FDC 413 determines that the broadcast transaction is anomalous or includes attribute values that are outside a threshold tolerance, notification controller 415 may generate and transmit an alert to payment instruments 403, 405 and 407. Payment instruments 403, 405 and 407 may receive information via internet access to web 425.

The alert may provide transaction attribute values associated with the broadcast transaction. In some embodiments, users of payment instruments 403, 405 and 407 may be prompted to approve or reject the broadcast transaction.

In some embodiments, FDC 413 may decide whether to approve or reject the broadcast transaction. In such embodiments, notification controller 415 may present an alert that informs the users of payment instruments 403, 405 and 407 whether a transaction has been approved or rejected.

Alerts formulated by notification controller 415 may be presented on digital touch display 423. Digital touch display may include OLED technology. Microprocessor 421 may provide processing power that controls over operation of a payment instrument, including operation of BCC 409, FDC 413 and notification controller 415. Control partner distributed ledger module ("CPDLM") 417 provides functionality that determines whether to add/remove payment instruments to/from a fraud resistant transaction network and associated distributed ledger. CPDLM 417 may be accessed remotely, such as via an online banking portal.

Thus, apparatus and methods for DISTRIBUTED LEDGER BASED ARTIFICE PROHIBITION TECHNOLOGY have been provided. Persons skilled in the art will appreciate that the present disclosure can be practiced by other than the described embodiments, which are presented for purposes of illustration rather than of limitation. The present disclosure is limited only by the claims that follow.

What is claimed is:

1. A fraud resistant transaction network comprising:
   a first payment instrument ("PI") comprising:
      a first nano network interface card ("nNIC");
      a first processor; and
      a first memory location storing a first cryptographical key and a first instance of a blockchain node application;
   a second PI comprising:
      a second nNIC;
      a second processor; and
      a second memory location storing a second cryptographical key and a second instance of a blockchain node application; and
   a merchant point-of-sale terminal ("MPOS") storing a third instance of the blockchain node application;
   wherein:
   the first PI initiates a transaction at the MPOS by activating the first instance of the blockchain node application, signing the transaction using the first cryptographic key and using the first nNIC, broadcasts the transaction to one or more nodes on the fraud resistant transaction network;
   the MPOS, in response to receiving the transaction:
      activates the third instance of the blockchain node application;
      verifies that the transaction has been signed by the first cryptographic key; and
      stores the transaction locally on the MPOS when the transaction is signed using the first cryptographic key and is bounded by at least two prior transactions received from the first PI;

the second PI, in response to receiving the transaction:
  activates the second instance of the blockchain node application;
  verifies the transaction has been signed by the first cryptographic key; and
  determines that the transaction is bounded by at least two prior transactions received from the first PI and stored locally in the second memory location;
  authorizes the MPOS to execute the transaction; and
  after authorizing the MPOS, stores the transaction in the second memory location;
the MPOS executes the transaction in response to receiving the authorization from the second PI;
  the second instance of the blockchain node application executed on the second PI controls allocation of storage space within the second memory location by limiting a number of transactions broadcast by the first PI and stored in the second memory location;
each instance of the blockchain node application includes a consensus mechanism to verify transactions and a distributed ledger to record the transaction on the network;
the consensus mechanism synchronizes the distributed ledger across all instances of the blockchain node application that write to the distributed ledger; and
the first PI and the second PI each have:
  dimensions of 85.60 millimeters ("mm")×53.98 mm×8 mm; and
  insufficient computing power to alter the historical transaction record stored locally on each node.

2. The fraud resistant transaction network of claim 1, wherein the second PI instructs the MPOS to abort the transaction initiated by the first PI when the transaction is not bounded by at least two prior transactions stored locally in the second memory location or is not signed using the first cryptographic key.

3. The fraud resistant transaction network of claim 1, further comprising a third PI, wherein:
  the MPOS, in response to receiving the transaction from the first PI:
    determines that the second PI and the third PI are accessible on the fraud resistant transaction network via the first and a third nNICs;
    awaits authorization from both the second PI and the third PI before executing the transaction; and
    aborts the transaction when one or more of the second PI or third PI instructs the MPOS to abort the transaction.

4. The fraud resistant transaction network of claim 3, the third PI comprising:
  the third nNIC;
  a third processor; and
  a third memory location storing a fourth instance of a blockchain node application;
  wherein, the third PI, in response to receiving the transaction broadcast by the first PI:
  activates the fourth instance of the blockchain node;
  verifies the transaction has been signed by the first cryptographic key; and
  determines that the transaction is bounded by at least two prior transactions received from the first PI and stored locally in the third memory location;
  authorizes the MPOS to execute the transaction; and
  after authorizing the MPOS, stores the transaction locally in the third memory location.

5. The fraud resistant transaction network of claim 1, wherein, the second PI authorizes the MPOS to execute the transaction by transmitting to the MPOS a copy of the transaction broadcast by the first PI and signed using the second cryptographical key.

6. The fraud resistant transaction network of claim 1, wherein, the second PI authorizes the MPOS to execute the transaction by transmitting to the MPOS the transaction broadcast by the first PI cryptographically hashed to at least one other transaction stored locally in the second memory location.

7. The fraud resistant transaction network of claim 1 wherein:
  the first instance of the blockchain node application running on the first PI captures one or more transaction attributes of the transaction and broadcasts the transaction attributes along with the transaction; and
  the second PI determines that the transaction is bounded by at least two prior transactions received from the first PI by verifying that the transaction attributes associated with the transaction are within a predetermined range of stored transaction attributes associated with the least two prior transactions received from the first PI and stored locally in the second memory location.

8. The fraud resistant transaction network of claim 7 wherein, the one or more transaction attributes comprise one or more of: transaction amount, transaction time, transaction place, transaction date, transaction location, first PI user image, first PI voice sample and first PI user key press pattern.

9. The fraud resistant transaction network of claim 3 wherein the second and third PI store different sets of transactions broadcast by the first PI.

10. The fraud resistant transaction network of claim 3 wherein the MPOS submits an authorization request for the transaction to an issuer associated with the first PI in parallel with waiting for an authorization response from the second PI.

11. A fraud resistant transaction network comprising:
  a first payment instrument ("PI") comprising:
    a first nano network interface card ("nNIC");
    a first processor; and
    a first memory location storing a first cryptographical key and a first instance of a blockchain node application; and
  a second PI comprising:
    a second nNIC;
    a second processor; and
    a second memory location storing a second cryptographical key and a second instance of a blockchain node application; and
  wherein:
  the first PI initiates a transaction by activating the first instance of the blockchain node application, signing the transaction using the first cryptographic key and using the first nNIC to broadcast the transaction onto the fraud resistant transaction network;
  the second PI, in response to receiving the transaction broadcast by the first PI:
    activates the second instance of the blockchain node application;
    verifies the transaction has been signed by the first cryptographic key; and
    determines that attributes of the transaction are outside a predetermined range of values, wherein the predetermined range is determined dynamically by the second instance of the blockchain node by examining at least two prior transactions received from the first PI and stored locally in the second memory location;

formulates a rejection of the transaction;

broadcasts the rejection onto the fraud resistant transaction network thereby requiring the second instance of the blockchain node application on the fraud resistant transaction network to prompt the first PI for a PIN before approving any future transaction initiated by the first PI;

the second instance of the blockchain node application executed on the second PI controls allocation of storage space within the second memory location by limiting a number of transactions broadcast by the first PI and stored in the second memory location;

each instance of the blockchain node application includes a consensus mechanism to verify transactions and a distributed ledger to record the transaction on the network;

the consensus mechanism synchronizes the distributed ledger across all instances of the blockchain node application that write to the distributed ledger; and the first PI and the second PI each have:
dimensions of 85.60 millimeters ("mm")×53.98 mm×8 mm; and
insufficient computing power to alter the historical transaction record stored locally on each node.

12. The fraud resistant transaction network of claim 11, wherein:
the second memory location stores a record of transactions initiated by the first PI and approved by the second PI; and
each of the transactions in the record are sequentially linked to each other by a hashed value of a previous transaction stored in the second memory location.

13. The fraud resistant transaction network of claim 11, wherein the second PI comprises:
an organic light emitting diode ("OLED") display; and
the processor presents, on the OLED display:
the transaction and associated transaction details broadcast by the first node; and
the rejection of the transaction broadcast by the first PI.

\* \* \* \* \*